(12) United States Patent
Hogerheiden, Jr. et al.

(10) Patent No.: US 9,014,315 B1
(45) Date of Patent: Apr. 21, 2015

(54) CASCADED HIGH-LEVEL NARROWBAND/LOW-LEVEL WIDEBAND INTERFERENCE CANCELER

(71) Applicant: Exelis Inc., McLean, VA (US)

(72) Inventors: John Hogerheiden, Jr., Camarillo, CA (US); Gregory D. Hogerheiden, Camarillo, CA (US)

(73) Assignee: Exelis Inc., McLean, VA (US)

( * ) Notice: Subject to any disclaimer, the term of this patent is extended or adjusted under 35 U.S.C. 154(b) by 0 days.

(21) Appl. No.: 14/247,611

(22) Filed: Apr. 8, 2014

(51) Int. Cl.
*H04B 1/10* (2006.01)
*H04B 1/12* (2006.01)

(52) U.S. Cl.
CPC ..................... *H04B 1/123* (2013.01)

(58) Field of Classification Search
CPC ........ H04B 1/109; H04B 1/71; H04B 1/0003; H04B 1/005; H04B 1/0092; H04B 1/7097; H04L 25/0292; H04L 27/2647
USPC .................................. 375/346, 350
See application file for complete search history.

(56) References Cited

U.S. PATENT DOCUMENTS 5,321,726 A 6/1994 Kafadar
6,683,913 B1 * 1/2004 Kantschuk ................. 375/258
2002/0090915 A1 * 7/2002 Komara et al. ............. 455/69
2010/0007555 A1 * 1/2010 Ezal et al. ............... 342/357.12
2013/0308940 A1 * 11/2013 Kpodzo et al. .............. 398/39
2014/0169410 A1 * 6/2014 Tanaka et al. ............. 375/148

OTHER PUBLICATIONS

Rabindra N. Ghose, "Interference Mitigation—Theory and Application," The Institute of Electrical and Electronics Engineers, Inc., 1996, IEEE Press, New York.

* cited by examiner

*Primary Examiner* — Don N Vo
(74) *Attorney, Agent, or Firm* — Edell, hapiro & Finnan LLC

(57) ABSTRACT

A receiver receives radio frequency (RF) energy including a desired signal and interference including high-level narrowband interference and low-level wideband interference. A first stage canceler cancels the high-level narrowband interference from the received RF energy based on a first correction signal representative of the interference, to produce a first canceler output signal. A second stage canceler frequency down-converts to baseband, and filters the high-level narrowband interference from, a sample of the first correction signal, to produce a second correction signal including the low-level wideband interference frequency down-converted to baseband. A digital canceler digitally cancels the low-level wideband interference from the first canceler output signal based on the second correction signal, to recover the desired signal.

20 Claims, 5 Drawing Sheets

CASCADED HIGH-LEVEL NARROWBAND/LOW-LEVEL WIDEBAND INTERFERENCE CANCELER

FIELD OF THE INVENTION

The present disclosure relates to interference cancelers.

BACKGROUND

A radio frequency (RF) transmitter may interfere with an RF receiver located nearby, for example, where the transmitter and receiver are co-located on the same platform. The transmitter typically transmits RF energy that includes a main transmit signal surrounded by wideband noise and spurs. The transmitted energy leaks over to the nearby receiver as interference at a relatively high level. The interference includes both high-level narrowband interference (i.e., the main transmit signal) and low-level wideband noise (i.e., the wideband noise and spurs). The interference masks low-level signals of interest in the receiver and may overdrive or even damage sensitive components of the receiver, such as a low noise amplifier in a receiver front-end. Therefore, it is desirable to use of an interference canceler to cancel the interference before the receiver front-end.

Conventional interference canceler techniques and circuits directed to canceling high-level narrowband interference effectively and conventional techniques and circuits directed to canceling low-level wideband interference effectively tend to be different and incompatible because of the disparate characteristics of the two types of interference; a canceling technique that works well for one type of interference does not work well for the other type of interference and vice-versa. As a result, a conventional interference canceler designed to cancel both types of interference disadvantageously includes a large number of circuit components, which drives-up the size, complexity, and cost of the interference canceler.

SUMMARY

Techniques described herein relate to cascaded interference cancelers associated with a receiver. The receiver includes a receive path to receive radio frequency (RF) energy including a desired signal and interference including high-level narrowband interference and low-level wideband interference. A first stage canceler includes first analog components to cancel the high-level narrowband interference from the received RF energy based on a first correction signal representative of the interference to produce a first canceler output signal. A second stage canceler includes second analog components configured to frequency down-convert to baseband and filter the high-level narrowband interference from a sample of the first correction signal (using a low-pass filter) to produce a second correction signal including the low-level wideband interference frequency down-converted to baseband. The second stage canceler also includes a digital canceler to digitally cancel the low-level wideband interference from the first canceler output signal based on the second correction signal in order to recover the desired signal.

DETAILED DESCRIPTION

Figure 1:
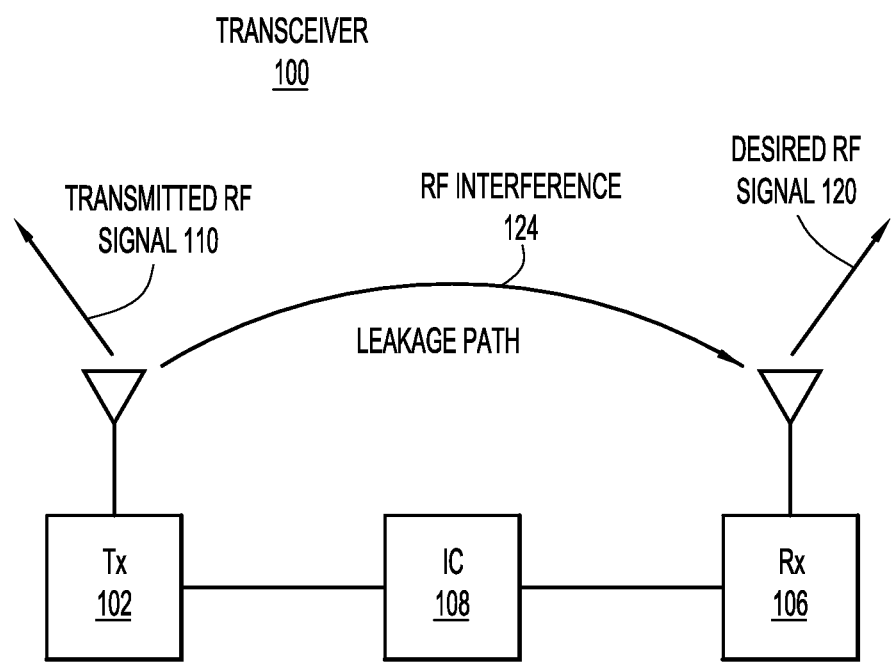
FIG. 1 is a block diagram of an example transmitter (TX)/receiver (RX) system (i.e., transceiver) in which a cascaded high-level narrowband/low-level wideband interference canceler as described herein may be implemented.

With reference to FIG. 1, there is depicted a block diagram of an example transmitter (TX)/receiver (RX) system 100 (also referred to as a transceiver 100) in which techniques describe herein may be implemented. System 100 includes a transmitter 102, a receiver 106, and an interference canceler (IC) 108 coupled with the receiver and the transmitter. Transmitter 102 and receiver 106 may be situated relatively close to each other, for example, co-located with each other on a transceiver platform, but are otherwise operated independently for purposes of transmitting signals to intended destinations and receiving desired signals.

In operation, transmitter 102 transmits RF energy 110 that typically includes a relatively high-level (i.e., high-power) narrowband (i.e., narrow bandwidth) RF signal and unwanted relatively low-level (i.e., low-power) wideband (i.e., wide bandwidth) noise, harmonic spurs, and non-harmonic spurs generated as by products in the transmitter. The wideband noise and harmonic spurs of transmitted RF energy 110 are collectively referred to herein simply as "wideband noise." Transmitted RF energy 110 is not generally intended for receiver 106. Instead, receiver 106 receives a desired RF signal 120 having a frequency anywhere within an RF frequency range of the receiver. The frequency range of receiver 106 typically encompasses frequencies present in transmitted RF energy 110.

Depending on the proximity of transmitter 102 to receiver 106, a substantial portion of transmitted RF energy 110 may find its way to receiver 102 via a wireless RF leakage path between the transmitter and the receiver to become undesired RF interference 124 at the receiver. In other words, the relatively high-level narrowband signal and low-level wideband noise of transmitted signal 110 respectively become high-level narrowband interference and low-level wideband interference at receiver 106 (as presented in RF interference 124). As a result, receiver 106 receives/captures composite RF energy that includes desired RF signal 120 as well as undesired RF interference 124. In many instances, a level of desired RF signal 120 at receiver 106 may be substantially lower than the leakage levels of RF interference 124 at the receiver. Also, the high-level narrowband interference may overdrive or even damage components in receiver 106. Thus, it is desirable (or perhaps necessary) to cancel RF interference 124 from the composite RF energy in receiver 102 in order to recover desired signal 120 more cleanly.

Accordingly, interference canceler 108 cancels RF interference 124 from the composite RF energy received at receiver 106. Interference canceler 108 includes multiple stages or tiers of cancelation to cancel both the high-level narrowband interference and the low-level wideband interference from RF interference 124 and is, therefore, referred to as a "cascaded high-level narrowband/low-level wideband interference canceler."

Figure 2:
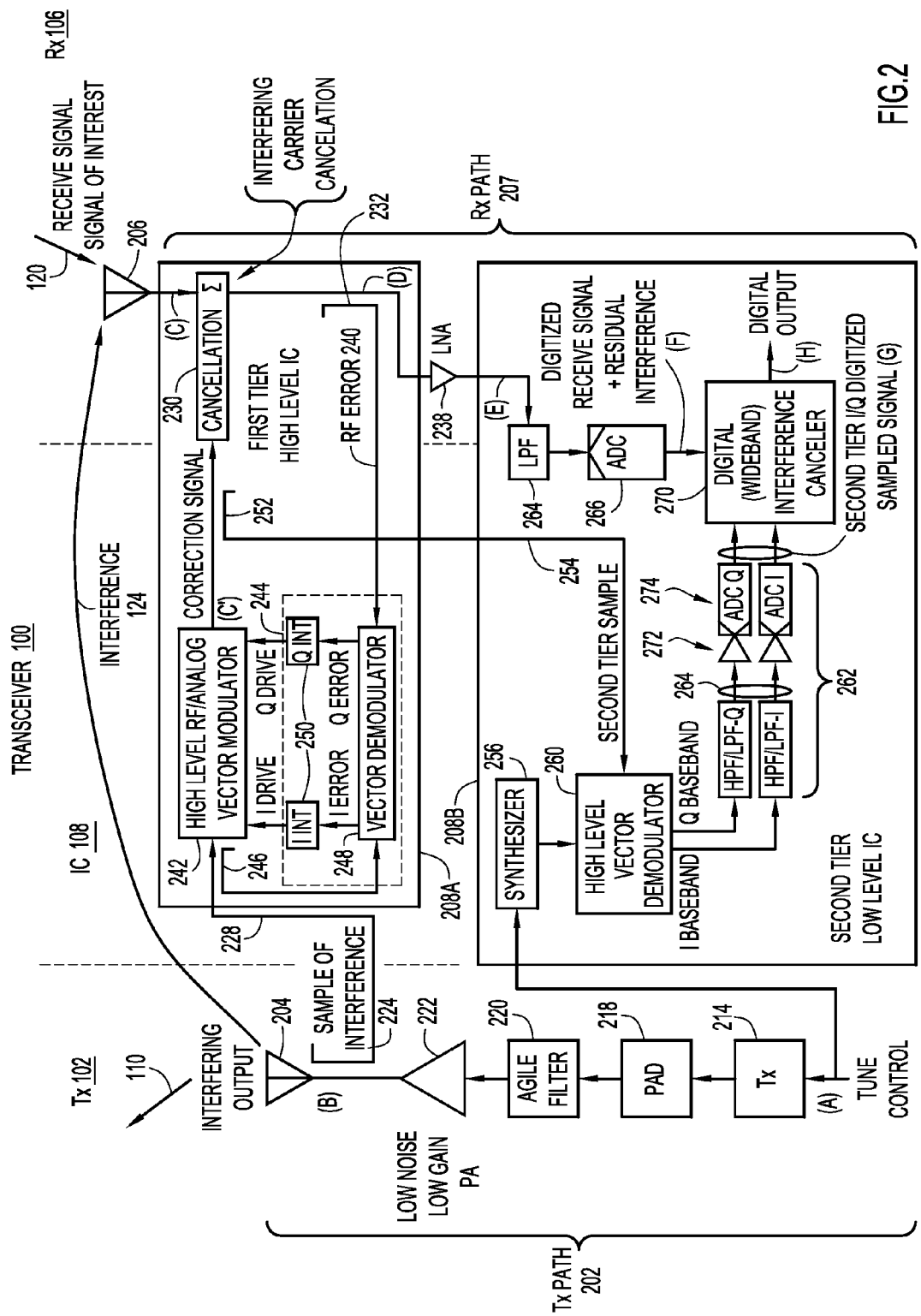
FIG. 2 is a detailed block diagram of the cascaded high-level narrowband/low-level wideband interference canceler of FIG. 1, according to an embodiment.

With reference to FIG. 2, there is depicted a detailed block diagram of transceiver/system 100, according to an embodiment. FIG. 2 is described also with reference to FIGS. 3A-3H. FIGS. 3A-3H are illustrations of example frequency spectrums (i.e., frequency vs. amplitude plots) of signals and interference introduced in FIG. 2 via reference labels corresponding to the reference labels of the figures. For example, a signal "A" introduced in FIG. 2 has a frequency spectrum illustrated in FIG. "3A," a signal "B" introduced in FIG. 2 has a frequency spectrum illustrated in FIG. "3B," and so on for subsequent signals C-H introduced in FIG. 2.

Figure 3A:
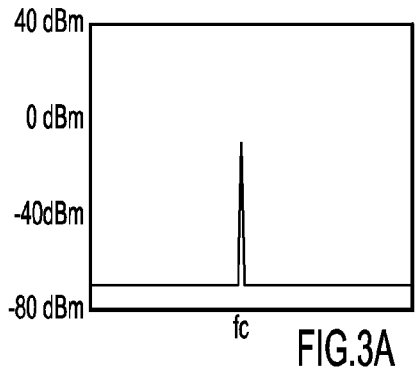
FIGS. 3A-3H are illustrations of example frequency spectrums (i.e., frequency vs. level/amplitude plots) of transceiver signals and interference introduced in the block diagram of FIG. 2.
Figure 3B:
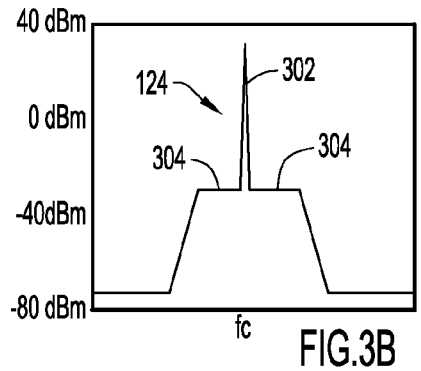

On the left-hand side of FIG. 2, TX 102 includes a TX path 202 to deliver a transmit signal B to a transmit antenna 204 that radiates the transmit signal as transmitted RF energy/signal 110. As depicted in FIG. 3B, transmit signal B includes a high-level narrowband transmit signal or carrier 302 centered at a carrier frequency fc and low-level wideband noise 304 centered about the carrier and having a level about 60 Decibels (dBs) down from a peak of the carrier. In an example, high-level transmit signal 302 is centered at carrier frequency fc in the Ultra High Frequency (UHF) band or the Very High Frequency (VHF) band, and has a modulation bandwidth in a range of 5-25 Kilohertz (KHz), although other center frequencies and modulation bandwidths are possible. In the example, low-level wideband noise 304 has a bandwidth in the Megahertz (MHz) range, although other bandwidths are possible.

Figure 3C:
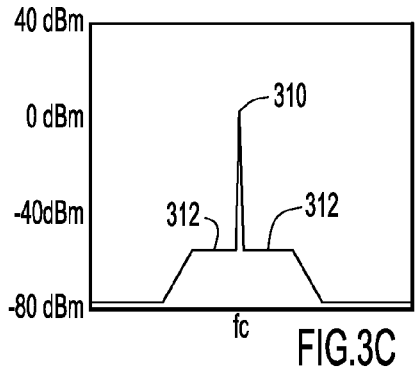

On the right-hand side of FIG. 2, RX 106 includes a receive antenna 206 to receive and deliver composite RF energy C, including desired signal 120 and interference 124, to a RX path 207 of the receiver. As depicted in FIG. 3C, received RF energy C includes high-level narrowband interference 310 and low-level wideband interference 312 corresponding to transmitted high-level narrowband signal 302 and low-level wideband noise 302 illustrated in FIG. 3B. Desired signal 120 may occur at any frequency in FIG. 3C, and may be received at a level well below and thus hidden by the interference. Returning to FIG. 2, IC 108 includes a first tier high-level narrowband IC 208A (referred to simply as first tier IC 208A) and a second tier low-level wideband IC 208B (referred to simply as second tier IC 208B) each coupled to both RX path 207 and TX path 202. First tier IC 208A and second tier IC 208B cancel the high-level narrowband interference and the low-level wideband interference from receive path 207, respectively, as described below.

TX path 202 includes the following components that perform sequential transmit signal processing to generate transmit signal B: a transmit signal synthesizer 214 to generate a low-level transmit signal centered at carrier frequency fc responsive to a tune control signal A (represented in FIG. 3A as a "clean" carrier frequency fc); a pad 218 to attenuate the low-level transmit signal; an agile filter 220 to filter the attenuated low-level transmit signal; and a power amplifier 222 to amplify the filtered low-level transmit signal, to produce transmit signal B at a high-level. TX path 202 also includes a coupler 224 to provide a sample 228 of transmit signal B to first tier IC 208A. Transmit signal sample 228 includes and is representative of the high-level narrowband and low-level wideband components of interference 124 at receive antenna 206. TX path 202 also provides tune control signal A to second tier IC 208B.

Receive antenna 206 delivers received composite RF energy C to analog RF components of receive path 207 that are shared with first tier IC 208A, including an RF canceling combiner 230 (which may be an RF summer), followed by an RF coupler 232. First tier IC 208A derives an RF correction signal C' (i.e., a first correction signal) from transmit signal sample 228 so that the correction signal is substantially equal in amplitude to and opposite in phase from (i.e., 180° out-of-phase with) the high-level narrowband interference in composite received RF energy C incident to summer 230. The frequency spectrum of RF energy C depicted in FIG. 3C is substantially the same as that of correction signal C'.

Figure 3D:
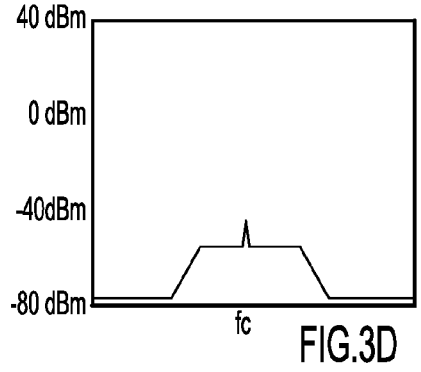

Summer 230 sums composite received RF energy C with correction signal C', to produce a first tier IC output signal D in which most of the high-level narrowband interference has been canceled, as is illustrated in FIG. 3D. Thus, first tier IC output signal D includes desired signal 120 and substantially only the low-level wideband interference (although there is a small amount of residual narrow-band interference in signal D). Coupler 232 provides first tier IC output signal D to a low noise amplifier (LNA) 238 of receive path 207. LNA 238 is not over-driven by first tier IC output signal D because the output signal is substantially free of the high-level narrowband interference. Coupler 232 also provides a sample of the first tier IC output signal as an RF feedback error signal 240 within first tier IC 208A. First tier IC 208A adjusts the amplitude and phase of correction signal C' based on RF feedback error signal 240, so as to more completely cancel the high-level narrowband interference at summer 230, as is now described in detail below.

In addition to summer 230 and coupler 232, first tier IC 208A includes at least one high-level analog vector modulator 242, a controller 244, and a coupler 246 to couple a sample of transmit signal sample 228 to the controller. The terms "vector," "quadrature," and "I and Q" as used herein are equivalent and may be used interchangeably. Controller 244 includes a vector demodulator 248 (which is also referred to as a "quadrature mixer") and quadrature negative integrators 250 (I-Integrator, Q-Integrator) following the vector demodulator. Vector modulator 242 and summer 230 are analog components configured to operate/withstand high-level RF signals, such as RF signals up to 10 Watts, for example. Controller 244 may be implemented using all analog components, all digital components, or a mix thereof.

Vector demodulator 248 derives quadrature error signals I-Error, Q-Error representative of phase and amplitude differences between RF error feedback signal 240 and transmit signal sample 228 (as represented in the sample thereof from coupler 246). Negative integrators 250 integrate quadrature error signals I-Error, Q-Error into quadrature drive/control signals I-Drive, Q-Drive, and provide the control signals to quadrature control inputs of vector modulator 242. Thus, vector demodulator 248 and quadrature integrators 250 collectively operate as quadrature correlators that correlate RF error feedback signal 240 with transmit signal sample 228 (as sampled by coupler 246). Vector modulator 242 derives correction signal C' so as to be substantially equal in amplitude to and opposite in phase from transmit signal sample 228 over the modulation bandwidth of the transmit signal (e.g., transmit signal 102, as sampled in signal 228) responsive to quadrature control/drive signals I-Drive, Q-Drive. The embodiment of first tier IC 208A depicted in FIG. 2 includes only one vector modulator and, therefore, effectively operates as a one-tap interference canceler to track and cancel interference over a relatively narrow bandwidth, such as, for example, 100 KHz, about center frequency fc. In other embodiments, multiple vector modulators may be connected in series to effectively increase the number of canceling taps and thus the bandwidth of interference cancelation in the first tier. If additional cancelation depth is required for the first tier, additional analog cancelers can be cascaded making the first tier itself a cascade canceler. All vector modulators in the first tier used either as multiple taps or single taps in cascade must also have sufficient power handling capability to avoid signal distortion.

First tier IC 208A also includes a coupler 252 to provide a sample 254 of RF correction signal C' to second tier IC 208B. Sample 254 is referred to herein as a second tier interference sample 254. Second tier IC 208B includes a frequency synthesizer 256, a high-level vector demodulator 260 (i.e., a quadrature mixer 260), and an analog baseband signal processing (BSP) chain 262. Analog vector demodulator 260 has a high-dynamic range and is able to handle relatively high-level signals, including the high-level narrowband interference in second tier interference sample 254. Second tier IC 208B also shares components with receive path 207, including, in series, a low pass filter (LPF) 264, an analog-to-digital converter (ADC) 266, and a digital interference canceler 270. ADC 266 has a sufficiently high clock/sample rate to allow the entire receive band to be digitized since the desired receive signal can be anywhere in this band. The receive path is capable of handling multiple desired receive signals simultaneously when ADC 266 has sufficient bandwidth due to the high sample rate.

Synthesizer 256 generates a local oscillator (LO) signal having a frequency equal to transmit carrier frequency fc responsive to tune control signal A and provides the LO signal to an LO input of vector demodulator 260. Based on the LO signal, vector demodulator 260 mixes or frequency down-converts second tier interference sample 254 by frequency fc so as to center a peak of the high-level narrowband interference therein at or near direct-current (DC) baseband (i.e., at or near zero Hertz). Vector demodulator 260 outputs quadrature baseband interference I-Baseband, Q-Baseband (also referred to as a "quadrature baseband sample of interference") to BSP chain 262. Another embodiment does not use tune control signal A from transmit path 202 to tune synthesizer 256. Rather, RX 106 includes a frequency measurement module that measures a center frequency of the interference in receive path 207 using any fast frequency measurement technique known to one of ordinary skill in the relevant arts. The measured center frequency is used as the tune control signal that tunes synthesizer 256, i.e., synthesizer 256 generates the LO signal at a frequency equal to the transmit carrier frequency fc response to the measured center frequency.

BSP chain 262 includes quadrature analog high-pass/low-pass filters HPF/LPF-I, HPF/LPF-Q to filter quadrature baseband interference I-Baseband, Q-Baseband. Filters HPF/LPF-I, HPF/LPF-Q each include (i) a high-pass filter characteristic to high-pass filter the respective quadrature component of the baseband interference I-Baseband, Q-Baseband so as to block/remove the high-level narrowband interference centered at zero Hz and pass the low-level wideband interference therein, and (ii) a low-pass filter characteristic to perform anti-alias filtering of the respective quadrature component of the baseband interference (prior to digitization thereof), to produce quadrature baseband wideband interference 264 representative of the low-level wideband interference frequency-shifted to baseband. The "quadrature baseband wideband interference" is also referred to as a "quadrature baseband sample of low-level wideband interference."

Figure 3E:
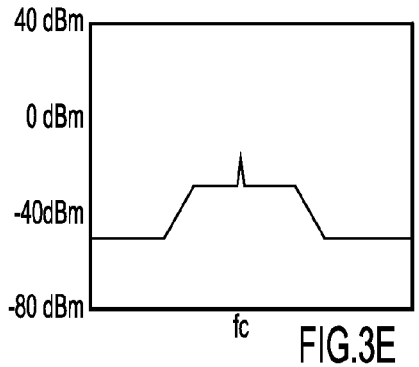
Figure 3F:
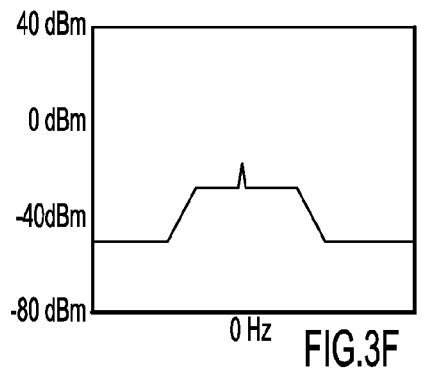
Figure 3G:
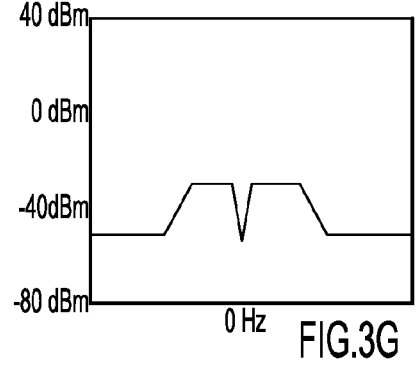
Figure 3H:
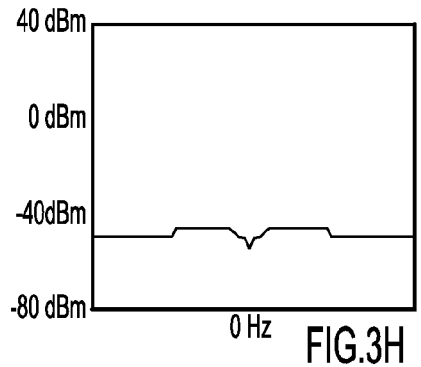

BSP chain 262 also includes quadrature amplifiers 272 followed by quadrature ADCs 274 to amplify and then digitize quadrature baseband wideband interference 264, to produce a digitized version thereof, namely, digitized quadrature baseband wideband interference G, which is also representative of the low-level wideband interference frequency-shifted to baseband. Digitized wideband interference G is also referred to as a second correction signal G because it was derived from (first) correction signal C'. As depicted in FIG. 3G, the high-level narrowband interference has been notched-out/eliminated by the high-pass filter characteristic of the corresponding one of filters HPF/LPF-I, HPF/LPF Q; however, the low-level wideband interference remains. ADCs 274 provide digitized quadrature wideband interference G to digital canceler 270. Shifting the interference to baseband using vector demodulator 260 advantageously simplifies the construction of the HPF/LPF filters, because simple tuned filters may be used to notch-out the high-level narrow-band interference positioned at DC. Shifting the interference to baseband and notching-out the high-level narrow-band interference advantageously simplifies the construction of ADCs 274 because ADCs with a lower dynamic range may be used (as the high-level interferer has been eliminated) and a lower sampling speed may be used (as the wideband frequency is at a lower frequency). Agile Filter 220 at the output of TX path 202 limits the bandwidth of transmitted noise and spurious, thus reducing the bandwidth and clock frequency needed by ADCs 274.

Returning to RX path 207, LNA 238 amplifies first tier IC output signal D to provide an amplified first tier IC output signal E to LPF 264. As depicted in FIG. 3E, output signal E is an amplified version of signal D including substantially only the low-level wideband interference (and the desired signal masked by the interference). Series connected LPF 264 and ADC 266 low-pass (e.g., anti-alias) filter and then digitize amplified first tier output signal D/E, to produce a digitized output signal F. The absence of the high-level narrowband interference in signal E eases performance requirements of ADC 266, e.g., dynamic range and level-handling requirements of the ADC. Digitized signal F includes desired signal 120 and the low-level wideband interference.

ADC 266 provides digitized signal F to digital canceler 270. Digital canceler 270 cancels the low-level wideband interference from digitized signal F based on digitized wideband interference G (representative of the low-level wideband interference), to produce a digitized receive signal H including desired signal 120 substantially free of all interference.

Figure 4:
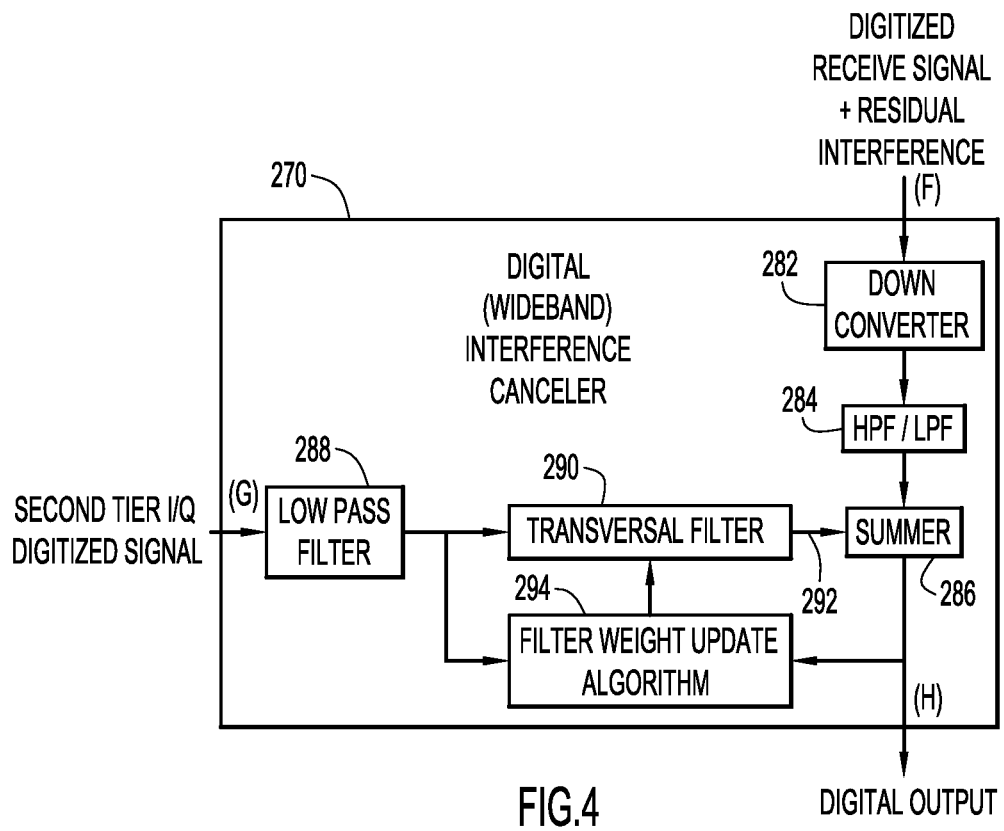
FIG. 4 is a block diagram of a digital interference canceler introduced in FIG. 2, according to an embodiment.

FIG. 4 is a block diagram of digital interference canceler (IC) 270 according to an embodiment. All of the components/modules (i.e., digital logic) of IC 270 depicted in FIG. 4 are digital components/modules that perform digital signal processing of respective digital signals. Also, all of the components/modules of IC 270 depicted in FIG. 4 may perform quadrature digital signal processing, i.e., the components/modules operate on both I and Q components of their respective signals. Continuing in receive path 207, digital IC 270 includes a digital down-converter 282 to shift signal E down to a received baseband signal, a HPF/LPF 284 to high-pass and low-pass filter the received baseband signal from digital down-converter 282 and provide the filtered received baseband signal (which includes desired signal 120 along with low-level wideband interference) to a canceling summer 286. Another embodiment of the digital interference canceler includes a digital up-converter between low pass filter 288 and transversal filter 290 to digitally up-convert the signal at the output of the low pass filter to the original higher frequency at which digital cancelation is performed, rather than to down-convert the receive signal. This embodiment eliminates the need for down converter 282.

Digital IC 270 also includes a LPF 288 to low-pass filter digitized wideband interference G (representative of the low-level wideband interference) and provide the low-pass filtered version of wideband interference G to a transversal filter 290. Transversal filter 290 derives a baseband correction signal 292 substantially equal in amplitude to and opposite in phase from components in the low-level wideband interference represented in the low-pass filtered version of signal G from LPF 288 based on multi-tap adaptive filter coefficients derived by a filter weight update module 294, and provides correction signal 292 to summer 286. Transversal filter 290 may be implemented in accordance with any of a number of different algorithms, such as, but not limited to, Least Mean Square, Recursive Least Squares, Gram-Schmidt, and Sample Matrix Inversion. Summer 286 sums correction signal 292 with the filtered received baseband signal to produce output H substantially free of all interference. Summer 286 provides a portion of output H to filter weight update module 294, which derives the filter coefficients based on this feedback and a reference sample of the low-pass filtered version of signal G from low pass filter 288.

An advantage of digital canceler 270 is that digital transversal filter 290 conveniently allows for many digital tap weights (filter coefficients) to provide deep, broad bandwidth canceling in a relatively small digital circuit as compared to an analog circuit designed to provide similarly deep, broad bandwidth canceling. This is especially advantages for canceling the wideband interference.

Figure 5:
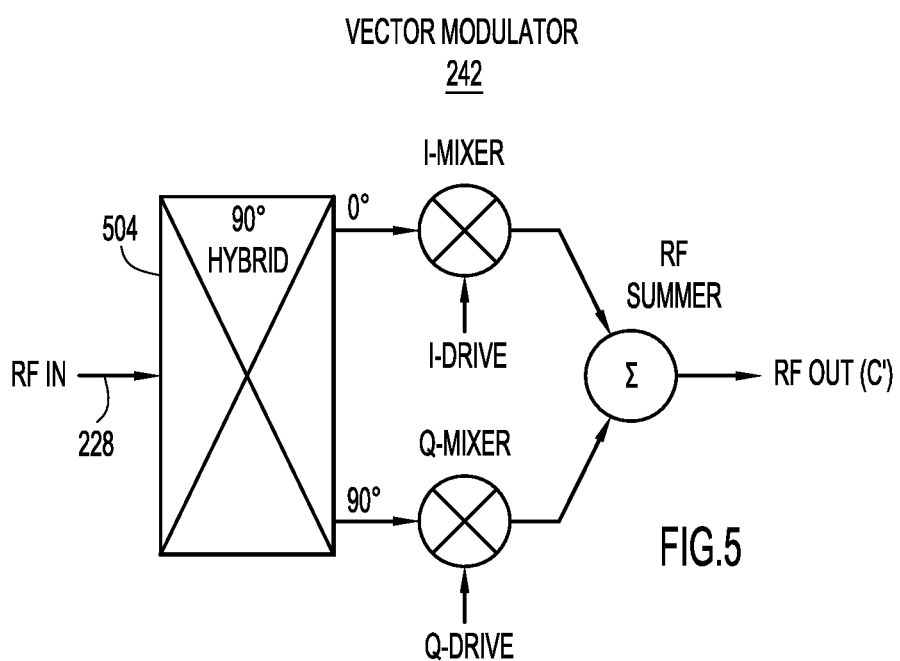
FIG. 5 is a block diagram of a vector modulator introduced in FIG. 2, according to an embodiment.

With reference to FIG. 5, there is depicted a block diagram of analog vector modulator 242 according to an embodiment. Vector modulator 242 includes a 90° hybrid 504 to split transmit signal sample 228 into a 90° phase-shifted version and a 0° (non-phase-shifted) version. An I-Mixer mixes the 0° version with the I-Drive signal and a Q-Mixer mixes the 90° phase-shifted version with the Q-Drive signal. The outputs of the I- and Q-Mixers are summed together at an RF Summer, to produce correction signal C'. The aforementioned components of vector modulator 242 may be implemented with PIN diodes as appropriate so that the vector modulator is able to handle high-level signals on the order of several Watts. The I and Q mixers may also be implemented as bi-phase attenuators.

Figure 6:
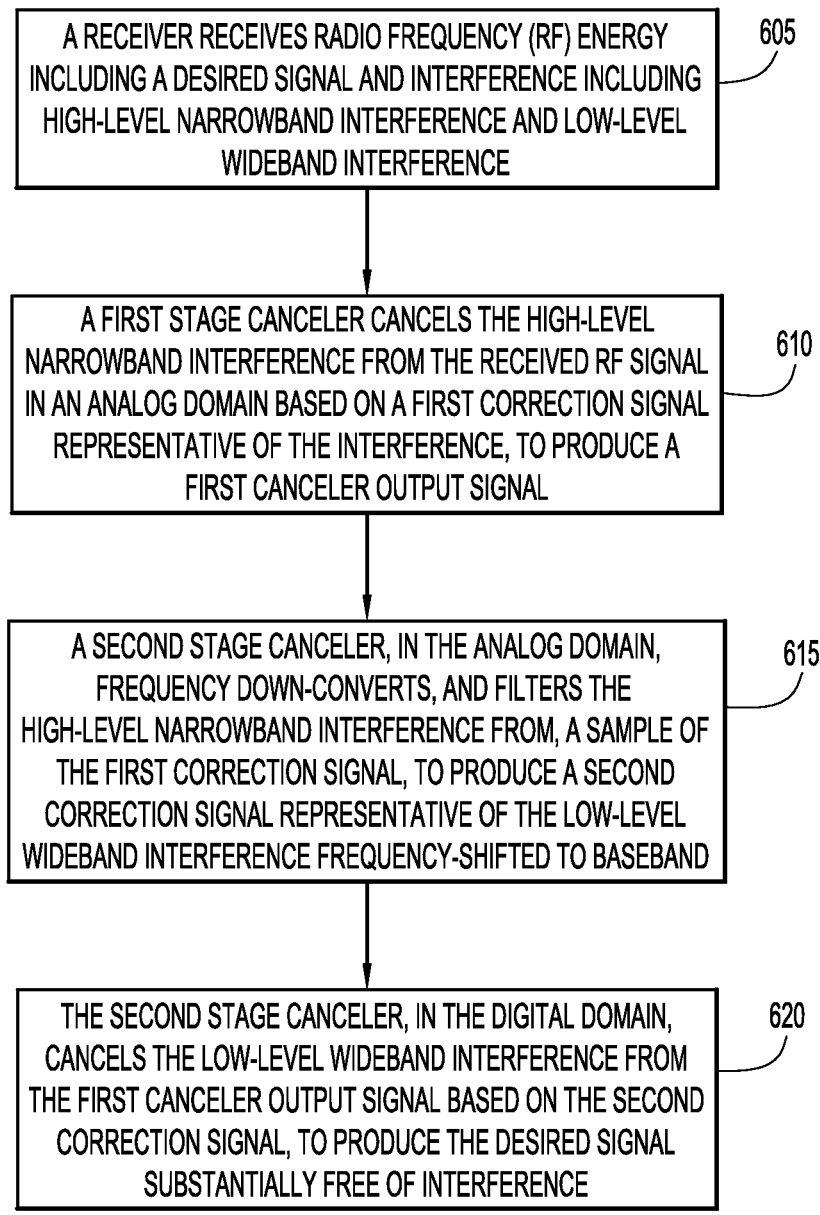
FIG. 6 is a flowchart of an example method of canceling high-level narrowband interference and low-level wideband interference in the transceiver of FIGS. 1 and 2.

With reference to FIG. 6, there is depicted a flowchart an example method 600 of canceling high-level narrowband interference and low-level wideband interference in system 100 that includes analog circuit components to process analog (i.e., continuous time) signals in an analog domain and digital circuit components that process digital/digitized signal in a digital domain.

At 605, receiver 106 receives radio frequency (RF) energy including a desired signal and interference including high-level narrowband interference and low-level wideband interference.

At 610, first stage 1C 208A filters the high-level narrowband interference from the received RF signal in the analog domain based on first correction signal 252 representative of the interference, to produce first canceler output signal D/E.

At 615, second stage IC 208B, in the analog domain, frequency down-converts, and filters the high-level narrowband interference from, sample 254 of the correction signal 252, to produce (intermediate signals, and then) second correction signal G representative of the low-level wideband interference frequency-shifted to baseband.

At 620, second stage 1C 208B, in the digital domain, cancels the low-level wideband interference from first canceler output signal D/E based on second correction signal G, to produce the desired signal.

In summary, in one form, an apparatus is provided, comprising: a receive path configured to receive radio frequency (RF) energy including a desired signal and interference including high-level narrowband interference and low-level wideband interference; a first stage canceler including first analog components configured to cancel the high-level narrowband interference from the received RF energy based on a first correction signal representative of the interference, to produce a first canceler output signal; and a second stage canceler, including: second analog components configured to frequency down-convert to baseband, and filter the high-level narrowband interference from, a sample of the first correction signal, to produce a second correction signal including the low-level wideband interference frequency down-converted to baseband; and a digital canceler configured to digitally cancel the low-level wideband interference from the first canceler output signal based on the second correction signal, to produce the desired signal.

In another form, a method is provided, comprising: in an apparatus including analog components to process analog signal in an analog domain and digital components to processor digital signals in a digital domain: receiving radio frequency (RF) energy including a desired signal and interference including high-level narrowband interference and low-level wideband interference; performing first stage canceling, including canceling the high-level narrowband interference from the received RF energy in the analog domain based on a first correction signal representative of the interference, to produce a first canceler output signal; and performing second stage canceling, including: in the analog domain, frequency down-converting, and filtering the high-level narrowband interference from, a sample of the first correction signal, to produce a second correction signal representative of the low-level wideband interference frequency-shifted to baseband; and in the digital domain, canceling the low-level wideband interference from the first canceler output signal based on the second correction signal, to produce the desired signal.

Although the apparatus and method are illustrated and described herein as embodied in one or more specific examples, it is nevertheless not intended to be limited to the details shown, since various modifications and structural changes may be made therein without departing from the scope of the apparatus and method and within the scope and range of equivalents of the claims. Accordingly, it is appropriate that the appended claims be construed broadly and in a manner consistent with the scope of the apparatus and method as set forth in the following claims.

What is claimed is:

1. An apparatus, comprising:
a receive path configured to receive radio frequency (RF) energy including a desired signal and interference including high-level narrowband interference and low-level wideband interference;
a first stage canceler including first analog components configured to cancel the high-level narrowband interference from the received RF energy based on a first correction signal representative of the interference, to produce a first canceler output signal; and
a second stage canceler, including:
second analog components configured to frequency down-convert to baseband, and filter the high-level narrowband interference from, a sample of the first correction signal, to produce a second correction signal including the low-level wideband interference frequency down-converted to baseband; and
a digital canceler configured to digitally cancel the low-level wideband interference from the first canceler output signal based on the second correction signal, to recover the desired signal.

2. The apparatus of claim 1, wherein the first analog components of the first stage canceler include:
   an analog coupler configured to sample the interference from a transmitter before the interference is radiated from an antenna of the transmitter;
   an analog vector modulator configured to generate the first correction signal based on differences in phase and amplitude between the sampled interference and the first canceler output signal so that the correction signal is substantially equal in amplitude to and opposite in phase from the high-level narrowband interference; and
   an analog summer to sum the first correction signal with the received signal to produce the first canceler output signal.

3. The apparatus of claim 2, wherein the first stage canceler further includes:
   a correlator configured to produce quadrature drive signals representative of the differences in phase and amplitude between the sampled interference and the first canceler output signal,
   wherein the analog vector modulator is configured to generate the first correction signal responsive to the quadrature drive signals.

4. The apparatus of claim 1, wherein the second analog components of the second stage canceler include:
   an analog vector demodulator configured to frequency down-covert the sample of the first correction signal to baseband, to produce a quadrature baseband sample of the interference that is representative of the high-level narrowband and low-level wideband interference; and
   analog filters having a high-pass filter characteristic configured to filter the quadrature baseband sample of the interference so as to block the high-level narrowband interference and pass the low-level wideband interference therein, to produce a quadrature baseband sample of the low-level wideband interference and on which the second correction signal is based.

5. The apparatus of claim 4, wherein:
   the analog vector demodulator is configured to frequency down-covert the first correction signal sample so as to center an amplitude peak of the high-level narrowband interference therein at a frequency of zero Hertz (Hz); and
   the analog filters are configured to filter the quadrature baseband sample of interference so as to block the high-level narrowband interference centered at the frequency of zero Hz.

6. The apparatus of claim 5, wherein:
   the second analog components further include a frequency synthesizer configured to generate a local oscillator (LO) signal at a frequency equal to a center frequency of the high-level narrowband interference responsive to a tune control signal; and
   the analog vector demodulator is configured to frequency down-convert the first correction signal sample representative of the interference based on the LO signal.

7. The apparatus of claim 6, wherein the digital canceler includes:
   a digital frequency down-converter configured to frequency down-convert the digitized first canceler output signal based by on a frequency of the interference; and
   digital canceler logic configured to cancel the low-level wideband interference from the down-converted digitized first canceler output signal based on the second corrections signal, to produce the desired signal substantially free of interference.

8. The apparatus of claim 4, wherein the second stage canceler further includes analog-to-digital converters (ADCs) configured to digitize the quadrature baseband sample of the low-level wideband interference, to produce a digitized quadrature baseband sample of the low-level wideband interference as the second correction signal.

9. The apparatus of claim 8, wherein the analog filters further include a low-pass filter characteristic configured to anti-alias filter the quadrature baseband sample of the interference that is representative of the high-level narrowband and low-level wideband interference.

10. The apparatus of claim 8, wherein:
    the receive path includes an analog-to-digital converter (ADC) configured to digitize the first canceler output signal; and
    the digital canceler is configured to digitally cancel the low-level wideband interference from the digitized first canceler output signal based on the second correction signal.

11. A method, comprising:
    in an apparatus including analog components to process analog signal in an analog domain and digital components to processor digital signals in a digital domain:
    receiving radio frequency (RF) energy including a desired signal and interference including high-level narrowband interference and low-level wideband interference;
    performing first stage canceling, including canceling the high-level narrowband interference from the received RF energy in the analog domain based on a first correction signal representative of the interference, to produce a first canceler output signal; and
    performing second stage canceling, including:
      in the analog domain, frequency down-converting, and filtering the high-level narrowband interference from, a sample of the first correction signal, to produce a second correction signal representative of the low-level wideband interference frequency-shifted to baseband; and
      in the digital domain, canceling the low-level wideband interference from the first canceler output signal based on the second correction signal, to produce the desired signal.

12. The method of claim 11, wherein the first stage canceling includes, in the analog domain:
    sampling the interference from a transmitter before the interference is radiated from an antenna of the transmitter;
    vector modulating the sampled interference based on differences in phase and amplitude between the sampled interference and the first canceler output signal so as to generate the first correction signal, such that the correction signal is substantially equal in amplitude to and opposite in phase from the high-level narrowband interference; and
    summing the first correction signal with the received signal to produce the first canceler output signal.

13. The method of claim 12, wherein the first stage canceling further includes:
    quadrature drive signals representative of the differences in phase and amplitude between the sampled interference and the first canceler output signal,
    wherein the vector modulating generates the first correction signal responsive to the quadrature drive signals.

14. The method of claim 11, wherein the second stage canceling includes, in the analog domain:

quadrature mixing the sample of the first correction signal to baseband, to produce a quadrature baseband sample of the interference that is representative of the high-level narrowband and low-level wideband interference; and high-pass filtering the quadrature baseband sample of the interference so as to block the high-level narrowband interference and pass the low-level wideband interference therein, to produce a quadrature baseband sample of the low-level wideband interference and on which the second correction signal is based.

15. The method of claim 14, wherein:
the quadrature mixing in the analog domain includes frequency down-converting the first correction signal sample so as to center an amplitude peak of the high-level narrowband interference therein at a frequency of zero Hertz; and the high-pass filtering includes filtering the quadrature baseband sample of interference so as to block the high-level narrowband interference centered at the frequency of zero Hertz.

16. The method of claim 15, wherein the second stage canceling further includes, in the analog domain:
synthesizing a local oscillator (LO) signal at a frequency equal to a center frequency of the high-level narrowband interference responsive to a tune control signal; and the quadrature mixing includes frequency down-converting the first correction signal sample representative of the interference based on the LO signal.

17. The method of claim 14, wherein the second stage canceling further includes digitizing the quadrature baseband sample of the low-level wideband interference, to produce a digitized quadrature baseband sample of the low-level wideband interference as the second correction signal.

18. The method of claim 17, further comprising:
digitizing the first canceler output signal, wherein canceling in the digital domain includes digitally canceling the low-level wideband interference from the digitized first canceler output signal based on the second correction signal.

19. An apparatus, comprising:
a receive path to receive radio frequency (RF) energy including a desired signal and interference including high-level narrowband interference and low-level wideband interference;

an analog vector modulator to generate a first correction signal representative of the interference;

an analog summer to sum the correction signal with the received RF energy, to produce a first canceler output signal from which the narrowband interference is canceled;

an analog vector demodulator to frequency down-convert a sample of the correction signal to baseband, to produce a baseband sample of the interference;

an analog filter to remove the narrowband interference from the baseband sample of the interference, to produce a baseband sample of the wideband interference;

an analog-to-digital converter (ADC) to digitize the baseband sample of the wideband interference; and a digital canceler to digitally cancel the wideband interference from the first canceler output signal based on the digitized baseband sample of the wideband interference, to produce the desired signal.

20. The apparatus of claim 19, wherein:
the analog filter includes quadrature filters to filter quadrature components of the baseband sample; and the ADC includes quadrature ADC to digitize quadrature components of the baseband sample of the wideband interference.

* * * * *